(12) United States Patent
Choi et al.

(10) Patent No.: US 11,433,878 B2
(45) Date of Patent: Sep. 6, 2022

(54) APPARATUS AND METHOD OF CONTROLLING HYBRID VEHICLE

(71) Applicants: Hyundai Motor Company, Seoul (KR); Kia Motors Corporation, Seoul (KR)

(72) Inventors: Yong Kak Choi, Seoul (KR); Hyun Woo Lim, Gyeonggi-do (KR); Buhm Joo Suh, Gyeonggi-do (KR); Jinkuk Cho, Gyeonggi-do (KR); Kwanhee Lee, Gyeonggi-do (KR); Sungchan Na, Gyeonggi-do (KR); Yeongseop Park, Seoul (KR); Jihyun Park, Gyeonggi-do (KR); Seungwoo Hong, Seoul (KR); Dong Hee Han, Gyeonggi-do (KR); Hyunjin Kang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 86 days.

(21) Appl. No.: 16/889,340

(22) Filed: Jun. 1, 2020

(65) Prior Publication Data

US 2021/0155225 A1 May 27, 2021

(30) Foreign Application Priority Data

Nov. 25, 2019 (KR) .................. 10-2019-0152445

(51) Int. Cl.
*F02B 33/44* (2006.01)
*B60W 20/40* (2016.01)
(Continued)

(52) U.S. Cl.
CPC ............. *B60W 20/40* (2013.01); *B60L 58/12* (2019.02); *F02B 37/04* (2013.01);
(Continued)

(58) Field of Classification Search
CPC .......... B60K 2006/4825; B60W 10/08; B60W 27/0666; B60W 20/13; B60W 20/40;
(Continued)

(56) References Cited

U.S. PATENT DOCUMENTS 8,381,513 B2 * 2/2013 Schreurs .............. F02D 41/3035
60/285
9,102,325 B2 * 8/2015 Jung ..................... F02N 11/003
(Continued)

FOREIGN PATENT DOCUMENTS

| KR | 101371476 B1 | 3/2014 |
|---|---|---|
| KR | 101481288 B1 | 1/2015 |
| KR | 101714206 B1 | 3/2017 |

*Primary Examiner* — Gonzalo Laguarda
(74) *Attorney, Agent, or Firm* — Fox Rothschild LLP

(57) ABSTRACT

An apparatus for controlling a hybrid vehicle is provided. The apparatus includes an engine generating power by combustion of fuel, a driving motor assisting power of the engine and selectively operated as a power generator to generate electric energy and a clutch disposed between the engine and the driving motor. A battery supplies electric energy to the driving motor and charges the electric energy generated in the driving motor. A plurality of electric superchargers are installed in a plurality of intake lines, in which outside air supplied to combustion chambers of the engine flows, respectively and a controller variably adjusts an operating point of the engine.

16 Claims, 11 Drawing Sheets

(51) Int. Cl.
*F02B 37/04* (2006.01)
*F02D 41/00* (2006.01)
*B60L 58/12* (2019.01)
*F02B 37/10* (2006.01)

(52) U.S. Cl.
CPC ..... *F02D 41/0007* (2013.01); *F02D 41/0052* (2013.01); *F02D 41/0055* (2013.01); *B60W 2510/0676* (2013.01); *F02B 37/10* (2013.01)

(58) Field of Classification Search
CPC ........ B60W 2510/0676; F02D 41/0007; F02D 41/0052; F02D 41/0055; B60L 58/12; F02B 37/04; F02B 37/10; F02B 39/10
See application file for complete search history.

(56) References Cited

U.S. PATENT DOCUMENTS

| | | | |
|---|---|---|---|
| 2016/0009271 A1* | 1/2016 | Choi | B60W 40/09 |
| | | | 701/22 |
| 2017/0297555 A1* | 10/2017 | Jeong | B60K 6/448 |
| 2018/0171913 A1* | 6/2018 | Ulrey | F02D 41/0235 |
| 2019/0170052 A1* | 6/2019 | Dudar | F02D 41/047 |
| 2021/0146912 A1* | 5/2021 | Choi | B60W 10/04 |

* cited by examiner

APPARATUS AND METHOD OF CONTROLLING HYBRID VEHICLE

CROSS-REFERENCE TO RELATED APPLICATION

This application claims priority to and the benefit of Korean Patent Application No. 10-2019-0152445 filed on Nov. 25, 2019, the entire contents of which are incorporated herein by reference.

BACKGROUND

(a) Field of the Disclosure

The present disclosure relates to an apparatus and a method of controlling a hybrid vehicle, and more particularly, to an apparatus and a method of controlling a hybrid vehicle including an engine having a plurality of electric superchargers.

(b) Description of the Related Art

A hybrid vehicle is a vehicle that uses two or more types of power sources, and generally refers to a hybrid electric vehicle driven using an engine and a motor. The hybrid electric vehicle may form various structures by using two or more types of power sources including an engine and a motor. In general, the hybrid electric vehicle adopts a power train in a scheme of a Transmission Mounted Electric Device (TMED) in which a driving motor, a transmission, and a driving shaft are serially connected.

Further, a clutch is disposed between the engine and the motor, so that the hybrid electric vehicle is operated in an Electric Vehicle (EV) mode, a Hybrid Electric Vehicle (HEV) mode, or an engine single mode according to the coupling of the clutch. The EV mode is the mode in which the vehicle travels only with driving power of the driving motor, the HEV mode is the mode in which the vehicle travels with driving power of the driving motor and the engine, and the engine single mode is the mode in which the vehicle travels only with driving power of the engine.

In general, an operating point of the hybrid vehicle is determined based on a torque requirement of a driver, but it is important to constantly maintain a state of charge (SOC) that refers to a charging state of a battery according to a traveling state of the vehicle. Particularly, when a traveling load of the vehicle is substantial (e.g., when the vehicle travels on high ground, when the vehicle travels on a long downhill load, when a large load is connected to the vehicle, when an outside temperature is very high or low, so that an output of a battery is limited, and the like), when an engine operating point of the engine is not appropriately adjusted, the vehicle is operated in a high engine revolutions per minute (RPM) region, thus degrading engine efficiency and degrading fuel efficiency. Further, in the high load situation, when power of the engine is continuously assisted through the driving motor to satisfy a traveling condition, the driving motor may fail to prevent the SOC of the battery from being sharply decreased.

The above information disclosed in this section is merely for enhancement of understanding of the background of the disclosure, and therefore it may contain information that does not form the prior art that is already known in this country to a person of ordinary skill in the art.

SUMMARY

The present disclosure provides an apparatus and a method of controlling a hybrid vehicle, which controls an engine to be operated at an optimal engine operating point according to a traveling state of a vehicle to satisfy a torque requirement of a driver and prevent a state of charge (SOC) of a battery from being sharply decreased.

An exemplary embodiment of the present disclosure provides an apparatus for controlling a hybrid vehicle that may include: an engine configured to generate power by combustion of fuel; a driving motor configured to assist power of the engine and selectively operate as a power generator to generate electric energy; a Hybrid Starter and Generator (HSG) configured to start the engine and selectively operate as a power generator to generate electric energy; a clutch disposed between the engine and the driving motor; a battery configured to supply electric energy to the driving motor or charge electric energy generated in the driving motor; an exhaust gas recirculation apparatus configured to resupply a part of exhaust gas discharged from the engine to the engine; a plurality of electric superchargers installed in a plurality of intake lines, in which outside air supplied to combustion chambers of the engine flows, respectively; and a controller configured to variably adjust a traveling mode of a vehicle through the engine and the driving motor, an operating point of the engine, lock charge through the driving motor and the HSG, and a shifting pattern based on a torque requirement of a driver and a SOC of the battery, and determine an operation mode in which power consumption of the plurality of electric superchargers is minimized.

When the SOC of the battery is in a critical high region, the controller may be configured to adjust the traveling mode to be an electric vehicle (EV) mode, and when the torque requirement of the driver exceeds a maximum torque of the driving motor, the controller may be configured to adjust the traveling mode to be a hybrid electric vehicle (HEV) mode. When the traveling mode is the HEV mode, the controller may be configured to adjust the operating point of the engine to output an engine torque lower than an optimal operating line that refers to an optimal operating point of the engine by a predetermined range, and determine a shifting pattern to a normal shifting pattern, and when a temperature of a catalyst of a catalyst converter is equal to or greater than a predetermined temperature, the controller may be configured to adjust the shifting pattern to be a catalyst protecting normal shifting pattern.

When the SOC of the battery is in a high region, the controller may be configured to adjust the traveling mode to be an EV mode, and when the torque requirement of the driver exceeds a maximum torque of the driving motor, the controller may be configured to adjust the traveling mode to be an HEV mode. When the traveling mode is the HEV mode, the controller may be configured to adjust the operating point of the engine to be an optimal operating line that refers to an optimal operating point of the engine, and determine a shifting pattern to a normal shifting pattern, and when a temperature of a catalyst of a catalyst converter is equal to or greater than a predetermined temperature, the controller may be configured to adjust the shifting pattern to be a catalyst protecting normal shifting pattern.

When the SOC of the battery is in a normal discharge region, the controller may be configured to adjust the traveling mode such that an EV mode takes priority over an HEV mode. When the traveling mode is the HEV mode, the controller may be configured to adjust an operating point of the engine to be an optimal operating line, a lock charge in a coasting state may be performed when the vehicle travels on an uphill road, and the controller may be configured to determine a shifting pattern to a normal shifting pattern.

When a temperature of a catalyst of a catalyst converter is equal to or greater than a predetermined temperature, the controller may be configured to adjust the shifting pattern to be a catalyst protecting normal shifting pattern.

When the SOC of the battery is in a normal charge region, the controller may be configured to adjust the traveling mode such that an HEV mode takes priority over an EV mode. When the traveling mode is the HEV mode, when the torque requirement of the driver is in a high torque region, the controller may be configured to adjust the operating point of the engine to be an exhaust gas recirculation (EGR) max line, and when the torque requirement of the driver is in the low torque region that is lower than the high torque region, the controller may be configured to adjust the operating point of the engine to be an optimal operating line, a lock charge in a coasting state may be performed when the vehicle travels on a flat road and an uphill road, and the controller may be configured to determine a shifting pattern to a normal shifting pattern. When a temperature of a catalyst of a catalyst converter is equal to or greater than a predetermined temperature, the controller may be configured to adjust the shifting pattern to be a catalyst protecting normal shifting pattern.

When the SOC of the battery is in a low region, the controller may be configured to adjust the traveling mode to be an HEV mode, in the case where the traveling mode is the HEV mode, when the torque requirement of the driver is in a high torque region, the controller may be configured to adjust the operating point of the engine to be a part load max line. When the torque requirement of the driver is in a low torque region that is lower than the high torque region, the controller may be configured to adjust the operating point of the engine to be an optimal operating line, a lock charge in a coasting state may be performed when the vehicle travels on a downhill road, a flat road, and an uphill road, and the controller may be configured to determine a shifting pattern to a normal shifting pattern. When a temperature of a catalyst of a catalyst converter is equal to or greater than a predetermined temperature, the controller may be configured to adjust the shifting pattern to be a catalyst protecting low shifting pattern.

When the SOC of the battery is in a low region, the controller may be configured to adjust the traveling mode to be an HEV mode. In the case where the traveling mode is the HEV mode, when the torque requirement of the driver is in a high torque region, the controller may be configured to adjust the operating point of the engine to be a part load max line, and when the torque requirement of the driver is in a low torque region that is lower than the high torque region, the controller may be configured to adjust the operating point of the engine to be an optimal operating line. When the vehicle travels under a high load condition for a predetermined time or longer, the controller may be configured to adjust the operating point of the engine to be a catalyst protecting temperature line, a lock charge in a coasting state may be performed when the vehicle travels a flat road and on an uphill road, and the controller may be configured to determine a shifting pattern to a normal shifting pattern. When a temperature of a catalyst of a catalyst converter is equal to or greater than a predetermined temperature, the controller may be configured to adjust the shifting pattern to be a catalyst protecting low shifting pattern.

When the SOC of the battery is in a critical low region, the controller may be configured to adjust the traveling mode to be an HEV mode, when the torque requirement of the driver is in a high torque region, the controller may be configured to adjust the operating point of the engine to be a full load max line. When the torque requirement of the driver is in a low torque region that is lower than the high torque region, the controller may be configured to adjust the operating point of the engine to be an optimal operating line, when the vehicle is stopping, the controller may be configured to operate the engine to perform an idle charge, continuously maintain performance of a lock charge in a coasting state, and determine a shifting pattern to a normal shifting pattern. When a temperature of a catalyst of a catalyst converter is equal to or greater than a predetermined temperature, the controller may be configured to adjust the shifting pattern to be a catalyst protecting low shifting pattern.

Another exemplary embodiment of the present disclosure provides a method of controlling a hybrid vehicle that may include: determining a SOC of a battery and a torque requirement of a driver; and variably adjusting a traveling mode of a vehicle through the engine and the driving motor of the vehicle, an operating point of the engine, a lock charge condition through the driving motor and a hybrid starter and generator (HSG), and a shifting pattern based on the torque requirement of the driver and a SOC of the battery, and determining an operation mode in which power consumption of the plurality of electric superchargers is minimized.

When the SOC of the battery is in a critical high region, the traveling mode may be adjusted to be an EV mode, and when the torque requirement of the driver exceeds a maximum torque of the driving motor, the traveling mode may be adjusted to be an HEV mode. When the traveling mode is the HEV mode, the operating point of the engine may be adjusted to output an engine torque lower than an optimal operating line that refers to an optimal operating point of the engine by a predetermined range, and a shifting pattern may be determined to a normal shifting pattern. When a temperature of a catalyst of a catalyst converter is equal to or greater than a predetermined temperature, the shifting pattern may be adjusted to be a catalyst protecting normal shifting pattern.

When the SOC of the battery is in a high region, the traveling mode may be adjusted to be an EV mode, and when the torque requirement of the driver exceeds a maximum torque of the driving motor, the traveling mode may be adjusted to be an HEV mode. When the traveling mode is the HEV mode, an operating point of the engine may be adjusted to be an optimal operating line that refers to an optimal operating point of the engine, and a shifting pattern may be determined to a normal shifting pattern. When a temperature of a catalyst of a catalyst converter is equal to or greater than a predetermined temperature, the shifting pattern may be adjusted to be a catalyst protecting normal shifting pattern.

When the SOC of the battery is in a normal discharge region, the traveling mode may be adjusted such that an EV mode takes priority over an HEV mode, when the traveling mode is the HEV mode, an operating point of the engine may be adjusted to be an optimal operating line, a lock charge in a coasting state may be performed when the vehicle travels on an uphill road, and a shifting pattern may be determined to a normal shifting pattern. When a temperature of a catalyst of a catalyst converter is equal to or greater than a predetermined temperature, the shifting pattern may be adjusted to be a catalyst protecting normal shifting pattern.

When the SOC of the battery is in a normal charge region, the traveling mode may be adjusted such that an HEV mode takes priority over an EV mode, in the case where the traveling mode is the HEV mode, when the torque requirement of the driver is in a high torque region, the operating point of the engine may be adjusted to be an exhaust gas recirculation (EGR) max line. When the torque requirement of the driver is in the low torque region that is lower than the high torque region, the operating point of the engine may be adjusted to be an optimal operating line, a lock charge in a coasting state may be performed when the vehicle travels a flat road and on an uphill road, and a shifting pattern may be determined to a normal shifting pattern. When a temperature of a catalyst of a catalyst converter is equal to or greater than a predetermined temperature, the shifting pattern may be adjusted to be a catalyst protecting normal shifting pattern.

When the SOC of the battery is in a low region, the traveling mode may be adjusted to be an HEV mode, in the case where the traveling mode is the HEV mode, when the torque requirement of the driver is in a high torque region, the operating point of the engine may be adjusted to be a part load max line. When the torque requirement of the driver is in a low torque region that is lower than the high torque region, the operating point of the engine may be adjusted to be an optimal operating line, a lock charge in a coasting state may be performed when the vehicle travels on a downhill road, a flat road, and on an uphill road, and a shifting pattern may be determined to a normal shifting pattern. When a temperature of a catalyst of a catalyst converter is equal to or greater than a predetermined temperature, the shifting pattern may be adjusted to be a catalyst protecting low shifting pattern.

When the SOC of the battery is in a low region, the traveling mode may be adjusted to be an HEV mode, in the case where the traveling mode is the HEV mode, when the torque requirement of the driver is in a high torque region, the operating point of the engine may be adjusted to be a part load max line. When the torque requirement of the driver is in a low torque region that is lower than the high torque region, the operating point of the engine may be adjusted to be an optimal operating line. When the vehicle travels under a high load condition for a predetermined time or longer, the operating point of the engine may be adjusted to be a catalyst protecting temperature line, a lock charge in a coasting state may be performed when the vehicle travels a flat road and on an uphill road, and a shifting pattern may be determined to a normal shifting pattern. When a temperature of a catalyst of a catalyst converter is equal to or greater than a predetermined temperature, the shifting pattern may be adjusted to be a catalyst protecting low shifting pattern.

When the SOC of the battery is in a critical low region, the traveling mode may be adjusted to be an HEV mode, when the torque requirement of the driver is in a high torque region, the operating point of the engine may be adjusted to be a full load max line. When the torque requirement of the driver is in a low torque region that is lower than the high torque region, the operating point of the engine may be adjusted to be an optimal operating line, when the vehicle is stopping, an idle charge may be performed by operating the engine, a lock charge in a coasting state may be controlled to always be performed, and a shifting pattern may be determined to a normal shifting pattern. When a temperature of a catalyst of a catalyst converter is equal to or greater than a predetermined temperature, the shifting pattern may be adjusted to be a catalyst protecting low shifting pattern.

According to the apparatus and the method of controlling the hybrid vehicle according to the exemplary embodiment of the present disclosure, an operating point of an engine may be variably adjusted based on an SOC of a battery and a torque requirement of a driver, thereby satisfying the torque requirement of the driver and preventing the SOC of the battery from being sharply decreased.

Further, it may be possible to maintain an engine speed in a low RPM region under a high load condition, thereby improving fuel efficiency of a vehicle. It may also be possible to prevent an SOC of the battery from entering a low region thereby preventing an operating point of an engine from entering a part load max line and thus reducing emission. Further, the engine may be controlled not to be operated when an operation point of the engine is equal to or greater than a catalyst protecting line to prevent a catalyst from deteriorating. An output of the engine is improved by using the electric supercharger in the situation where the battery is being charged, and power of the battery is supplied to the electric supercharger in the situation where the battery is being discharged, thereby improving charge/discharge efficiency of the battery.

BRIEF DESCRIPTION OF THE DRAWINGS

Since the drawings are for reference to describe the exemplary embodiment of the present disclosure, the technical spirit of the present disclosure should not be interpreted as being limited to the accompanying drawings.

DETAILED DESCRIPTION

Figure 1:
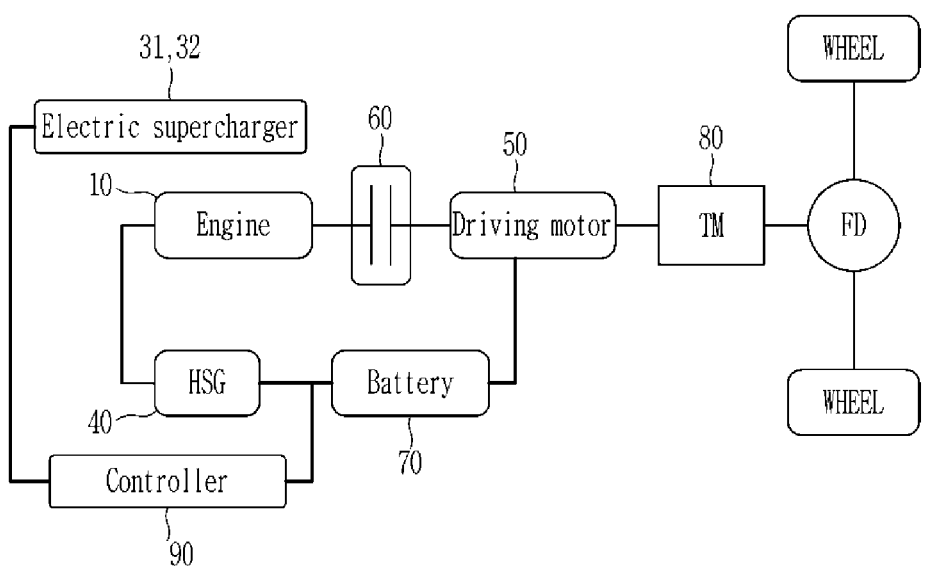
FIG. 1 is a conceptual diagram illustrating a configuration of an apparatus for controlling a hybrid vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g.

fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

The drawings and description are to be regarded as illustrative in nature and not restrictive, and like reference numerals designate like elements throughout the specification. In addition, the size and thickness of each configuration shown in the drawings are arbitrarily shown for understanding and ease of description, but the present disclosure is not limited thereto, and for clearly illustrate several portions and regions, thicknesses thereof are increased.

Hereinafter, an apparatus for controlling a hybrid vehicle according to an exemplary embodiment of the present disclosure will be described in detail with reference to the accompanying drawings.

The hybrid vehicle according to the exemplary embodiment of the present disclosure described below will be described based on a structure of a Transmission Mounted Electric Device (TMED) scheme as an example. However, the scope of the present disclosure is not limited thereto, and the present disclosure may be applied to hybrid electric vehicles in other schemes as a matter of course.

Figure 2:
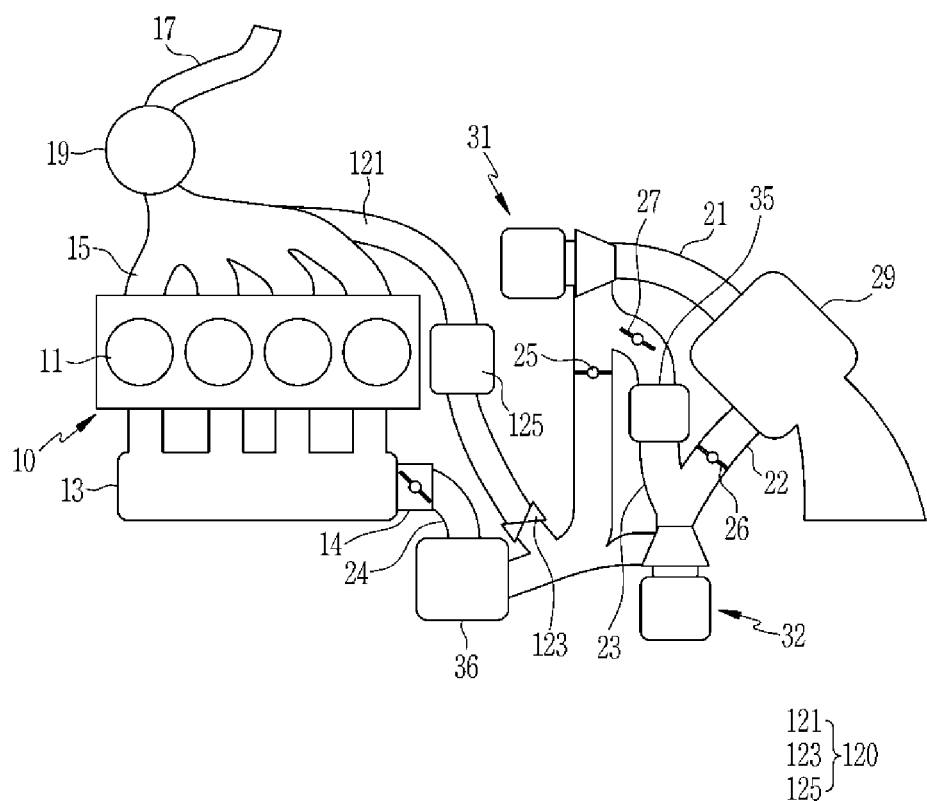
FIG. 2 is a conceptual diagram illustrating a relationship between an engine and an electric supercharger of the hybrid vehicle according to the exemplary embodiment of the present disclosure.
Figure 3:
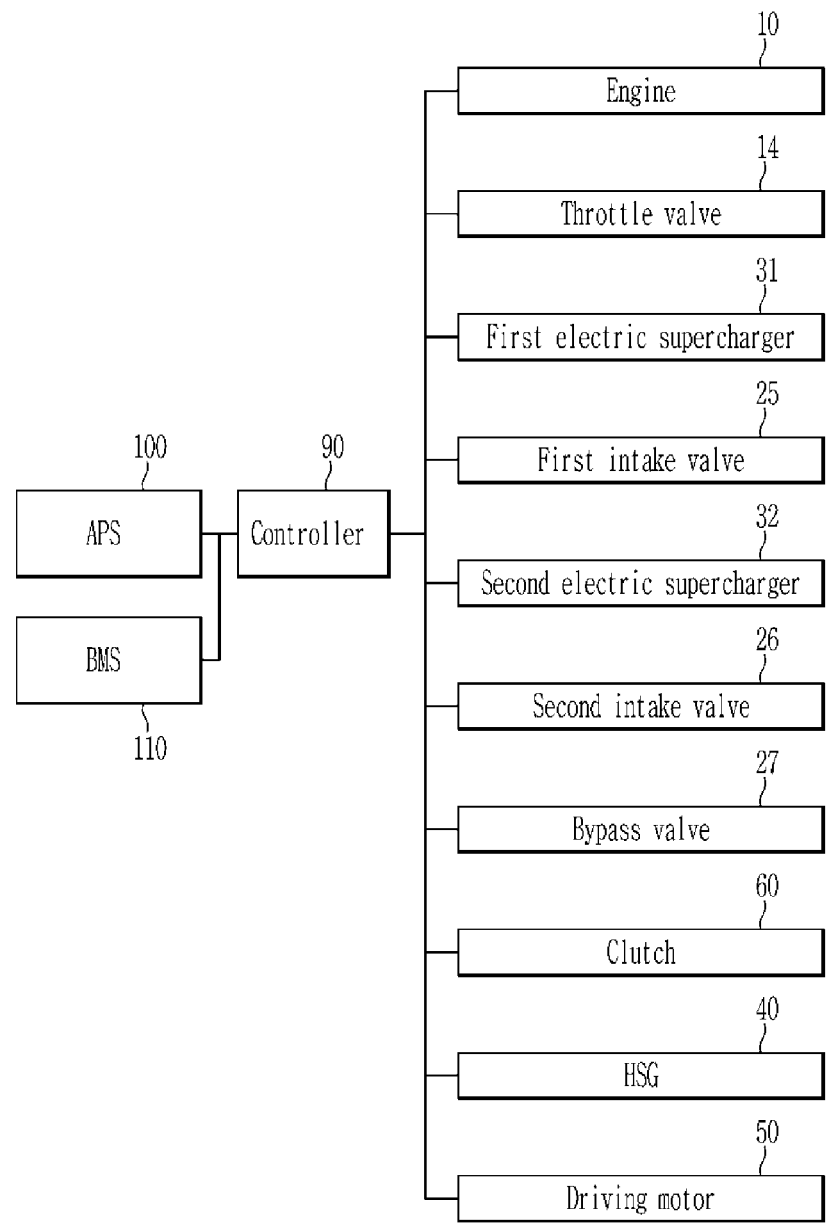
FIG. 3 is a block diagram illustrating the configuration of the apparatus for controlling the hybrid vehicle according to the exemplary embodiment of the present disclosure.

As illustrated in FIGS. 1 to 3, a hybrid vehicle to which the apparatus for controlling the hybrid vehicle according to the exemplary embodiment of the present disclosure is applied may include an engine 10, a HSG 40, a driving motor 50, a clutch 60, a battery 70, a plurality of electric superchargers, an acceleration pedal sensor, and a controller 90. First, a structure of the engine 10 system to which the apparatus for operating the hybrid vehicle according to the exemplary embodiment of the present disclosure is applied will be described in detail with reference to the accompanying drawings.

The engine 10 system according to the exemplary embodiment of the present disclosure may include the engine 10 having a plurality of combustion chambers 11 which generates driving power by combustion of fuel, a plurality of intake lines in which outside air supplied to the combustion chambers 11 flows, and a plurality of electric supercharger installed in the plurality of intake lines, respectively. The intake air supplied to the combustion chamber 11 of the engine 10 may be supplied through the plurality of intake lines, and exhaust gas discharged from the combustion chamber 11 of the engine 10 may be discharged to the outside through an exhaust manifold 15 and an exhaust line 17. In particular, a catalyst converter 19 including a catalyst which purifies exhaust gas may be installed in the exhaust line 17.

The plurality of intake lines may include a first intake line 21 through which outside air supplied to the combustion chamber 11 flows and a second intake line 22 through which outside air supplied to the combustion chamber 11 flows. However, the scope of the present disclosure is not limited thereto. A connection line 23 which connects the first intake line 21 and the second intake line 22 may be installed between the first intake line 21 and the second intake line 22. In other words, the connection line 23 may be branched from the first intake line 21 and joined to the second intake line 22.

The electric supercharger installed in each of the first intake line 21 and the second intake line 22 is for the purpose of supplying supercharged air to the combustion chamber 11, and may include a motor and an electric compressor. The electric compressor may be operated by the motor and configured to compress outside air according to an operation condition and supply the compressed outside air to the combustion chamber 11.

A first intake valve 25 may be installed in the first intake line 21. Particularly, the first intake valve 25 may be installed in a downstream of the first electric supercharger 31 installed in the first intake line 21. The amount of intake air supplied through the first intake line 21 may be adjusted according to the opening amount of the first intake valve 25. A second intake valve 26 may be installed in the second intake line 22. Particularly, the second intake valve 26 may be installed in a downstream of a second electric supercharger 32 installed in the second intake line 22. The amount of intake air supplied through the second intake line 22 may be adjusted according to the opening amount of the second intake valve 26.

The first intake line 21 and the second intake line 22 may be joined to a main intake line 24, and a main intercooler 36 may be installed in the main intake line 24. Air compressed by the electric supercharger may be cooled by the main intercooler 36. The connection valve 27 may be installed in the connection line 23. In particular, an auxiliary intercooler 35 may be installed in the connection line 23. Air compressed by the first electric supercharger 31 may be cooled by the auxiliary intercooler 35.

An operation mode of the two electric superchargers may include a single mode in which outside air is compressed by any one electric supercharger (e.g., the first electric supercharger 31) between the two electric superchargers and may be supplied to the combustion chamber 11 of the engine 10, a parallel mode in which outside air is compressed by each electric supercharger and is supplied to the combustion chamber 11 of the engine 10, and a serial mode in which outside air primarily compressed by any one electric supercharger may be additionally compressed by the other electric supercharger and supplied to the combustion chamber 11 of the engine 10.

In the single mode, the first intake valve 25 may be opened, the second intake valve 26 and the connection valve 27 may be blocked, and the operation of the second electric supercharger 32 may be stopped. Further, outside air flowing through the first intake line 21 may be compressed by the operation of the first electric supercharger 31 and supplied to the combustion chamber 11 of the engine 10.

In the parallel mode, the first intake valve 25 and the second intake valve 26 may be opened, and the connection valve 27 may be blocked. Further, outside air flowing through the first intake line 21 and the second intake line 22 may be compressed by the operations of the first electric supercharger 31 and the second electric supercharger 32 and may be supplied to the combustion chamber 11 of the engine 10. In the serial mode, the first intake valve 25 and the second intake valve 26 may be blocked, and the connection valve 27 may be opened. Further, outside air flowing through the first intake line 21 may be primarily compressed by the first electric supercharger 31 and additionally compressed by the second electric supercharger 32, and supplied to the combustion chamber 11 of the engine 10.

An air cleaner 29 for filtering outside air introduced from the outside may be mounted in an entrance of the first intake line 21 and an entrance of the second intake line 22. Intake air introduced through the first intake line 21 and the second intake line 22 may be supplied to the combustion chamber 11 through the intake manifold 13. A throttle valve 14 may be mounted to the intake manifold 13 to adjust the amount of air supplied to the combustion chamber 11.

The HSG 40 may be configured to start the engine 10 and selectively operate as a power generator when the engine 10 starts to generate electric energy. The driving motor 50 assists power of the engine 10 and may be configured to selectively operate as a power generator to generate electric energy. The driving motor 50 may be operated by using electric energy charged in the battery 70, and the electric energy generated in the driving motor 50 and the HSG 40 may be charged in the battery 70.

Figure 4:
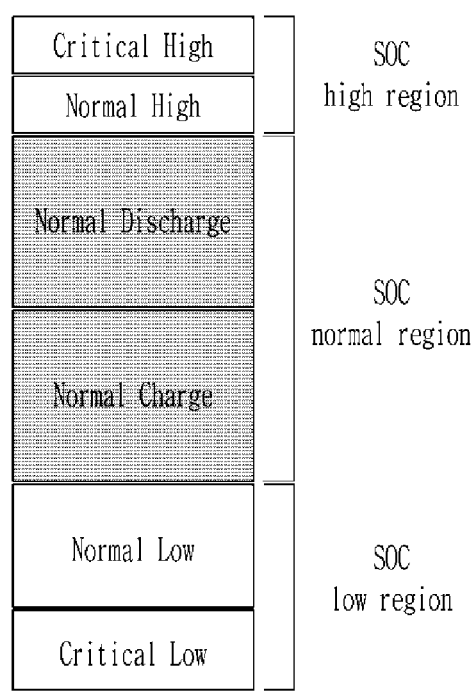
FIG. 4 is a diagram illustrating a State of Charge (SOC) region of a battery according to the exemplary embodiment of the present disclosure.
Figure 5:
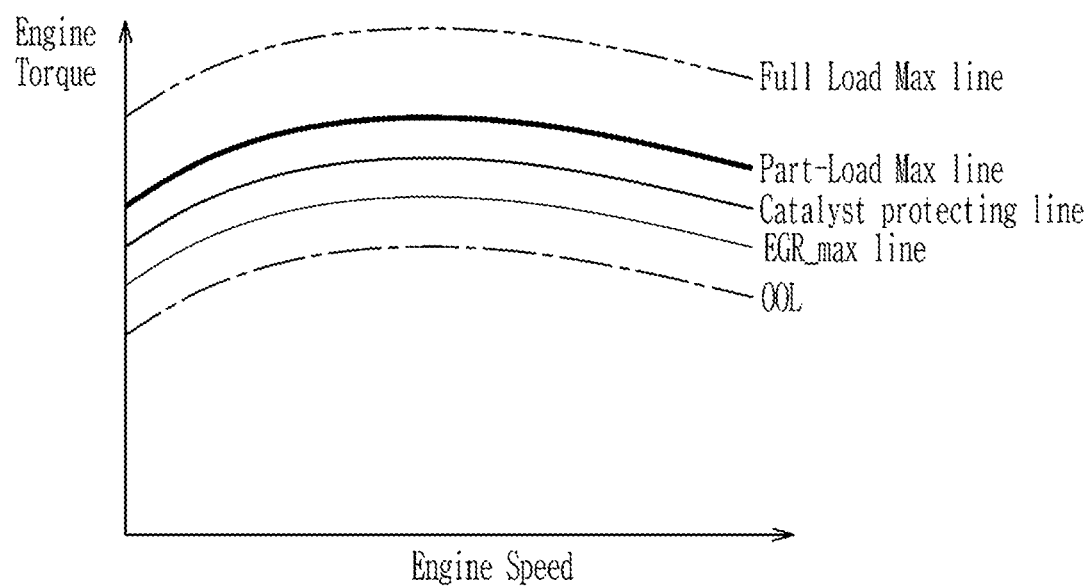
FIG. 5 is a diagram illustrating an operating point of the engine according to the exemplary embodiment of the present disclosure.
Figure 6:
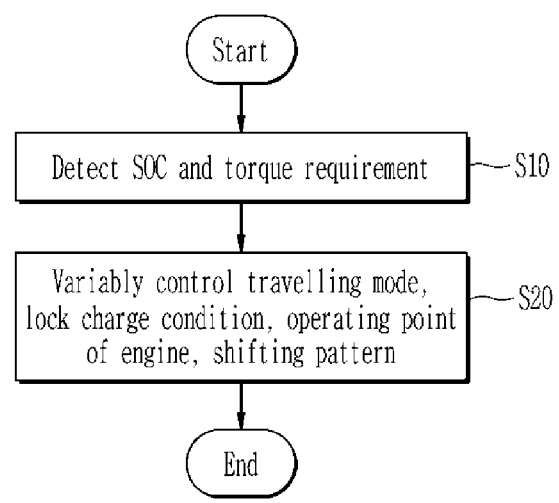
FIG. 6 is a flowchart illustrating a method of controlling a hybrid vehicle according to an exemplary embodiment of the present disclosure.

The apparatus for controlling the hybrid vehicle according to the exemplary embodiment of the present disclosure varies an operating point, a traveling mode, and a gear shifting pattern of the engine 10 based on a State Of Charge (SOC) of the battery 70 and a torque requirement of a driver. The SOC of the battery 70 may generally be divided into three regions. Referring to FIG. 4, the SOC region of the battery 70 may be divided into a high region, a normal region, and a low region according to the charging amount of the battery 70.

Further, according to the charging amount of the battery 70, the high region may be divided into a Critical High (CH) region and a Normal High (NH) region, the normal region may be divided into a Normal Discharge (ND) region and a Normal Charge (NC) region, and the low region may be divided into a Normal Low (NL) region and a Critical Low (CL) region.

The acceleration pedal sensor (APS) may be configured to detect an operation or engagement of an acceleration pedal. The accelerator pedal change amount detected by the accelerator pedal sensor may be transmitted to the controller 90. The controller 90 may then be configured to determine a torque requirement according to an acceleration intention of the driver from the accelerator pedal change amount detected by the accelerator pedal sensor, and selectively switch the traveling mode of the vehicle to the EV mode, the HEV mode, and the engine 10 single mode.

The transmission pattern may be divided into a normal shifting pattern and a catalyst protection shifting pattern. The SOC normal shifting pattern may be determined according to a current speed of the vehicle and the torque requirement of the driver (e.g., the acceleration pedal change amount), and may be pre-stored in the controller in the form of map data.

The catalyst protection shifting pattern may prevent an excessive increase in a temperature of a catalyst, and may be divided into a catalyst protection normal shifting pattern and a catalyst protection low shifting pattern according to the SOC of the battery. The catalyst protection normal shifting pattern refers to the shifting pattern when a catalyst temperature is equal to or greater than a set temperature and the SOC of the battery is in the normal region or more, and the catalyst protection low shifting pattern refers to the shifting pattern when a catalyst temperature is equal to or greater than a set temperature and the SOC of the battery is in the low region.

The catalyst normal shifting pattern may be determined according to a current speed of the vehicle, the torque requirement of the driver (e.g., the acceleration pedal change amount), the SOC of the battery, and a catalyst temperature of the catalyst converter, and the catalyst normal shifting pattern may be pre-stored in the controller in the form of map data. The catalyst protection normal shifting pattern may refer to an increase in driving power by reducing a shift stage by one stage compared to the SOC normal shifting pattern, and the catalyst protection low shifting pattern may refer to an increase driving power by reducing a shift stage by two or more stages compared to the normal shifting pattern.

In other words, when a catalyst temperature of the catalyst converter is very high (e.g., about 500° C.), the catalyst may deteriorate. To decrease the temperature of the catalyst, a torque of the engine should be decreased. When the torque of the engine is decreased, driving power of the vehicle meets by increasing an engine speed, and accordingly, the engine speed may be increased using the shifting pattern. When the SOC of the battery is in the low region, it is more important to recover the SOC of the battery than to cope with the traveling load, and thus, the torque of the engine is further decreased through the catalyst protection low shifting pattern.

The controller 90 may be configured to operate the constituent elements of the vehicle including the engine 10, the HSG 40, the driving motor 50, the electric superchargers, the battery 70, and the clutch 60. Accordingly, the controller 90 may be provided as one or more processors operated by a set program, and the set program may perform each operation of a method of controlling a hybrid vehicle according to an exemplary embodiment of the present disclosure.

The clutch 60 may be disposed between the engine 10 and the driving motor 50, and the hybrid vehicle may be operated in the engine 10 mode, the EV mode, or the Hybrid Electric Vehicle (HEV) mode according to the coupling of the clutch 60. The EV mode is the mode in which the vehicle travels with driving power of the motor, the HEV mode is the mode in which the vehicle travels with driving power of the motor and the engine 10, and the engine 10 mode is the mode in which the vehicle travels with driving power of the engine 10.

Driving power output from the engine 10 and the driving motor 50 may be transferred to the driving wheels provided in the vehicle. In particular, a transmission 80 may be disposed between the clutch 60 and the driving wheels. A shifting gear may be installed inside the transmission 80, so that power output from the engine 10 and the driving motor 50 may be changed according to a shifting gear stage.

The hybrid vehicle according to the exemplary embodiment of the present disclosure may further include an exhaust gas recirculation apparatus (EGR) 120. The EGR 120 may be configured to resupply a part of the exhaust gas discharged from the combustion chamber 11 of the engine 10 to the combustion chamber 11 of the engine 10, and may include an EGR line 121 which is branched from the exhaust line 17 and joined to the intake line, an EGR valve 123 installed in a recirculation line and configured to adjust the amount of recirculated exhaust gas, and an EGR cooler 125 installed in the recirculation line and configured to cool recirculated exhaust gas.

The exhaust gas discharged from the engine 10 may be discharged to the catalyst converter 19. The catalyst converter 19 and 55 may include a Lean NOx trap (LNT) for purifying a nitrogen oxide, a diesel oxidation catalyst, and a diesel particulate filter. Otherwise, the catalyst converter 19 and 55 may include a three way catalyst for purifying a nitrogen oxide. A temperature of the catalyst provided in the catalyst converter 19 may be detected using a temperature sensor and transmitted to the controller 90.

Hereinafter, a method of controlling a hybrid vehicle according to an exemplary embodiment of the present disclosure will be described in detail with reference to the accompanying drawings. The engine 10 of the hybrid vehicle according to the exemplary embodiment of the present disclosure may be operated with an operating point of any one among an Optical Operating Line (OOL), an EGR max line, a catalyst protecting line, a part-load max line, and a full-load max line based on an SOC of the battery 70 and a torque requirement of a driver.

The optical operating line may refer to an optimal operating point of the engine 10 and an operating point at which fuel consumption may be minimized. The EGR max line may refer to a maximum engine 10 torque capable of being output by the engine 10 when exhaust gas is recirculated to the combustion chamber 11 of the engine 10 by operating the exhaust gas recirculation apparatus.

In the catalyst protecting line, when the vehicle is driven under a high-load condition for a substantial period of time (e.g., 30 minutes or longer), a temperature of exhaust gas increases and a temperature of the catalyst within the catalyst converter 19 increases. When the temperature of the catalyst is excessively high, the catalyst deteriorates, and thus, the catalyst protecting line may mean the torque of the engine 10 for preventing the temperature of the catalyst from excessively increasing (e.g., 500° C.). The catalyst protecting line is mainly used in the SOC low region, and may also be used in the SOC normal region or high region.

The part load max line may refer to a maximum torque line capable of being output by the engine 10 when lambda of the engine 10 is less than "1". The full load max line may refer to a maximum torque capable of being output by the engine 10. The hybrid vehicle according to the exemplary embodiment of the present disclosure may supply supercharged air to the combustion chamber 11 of the engine 10 through the electric superchargers, thereby outputting a higher torque of the engine 10 compared to an existing natural aspiration engine 10.

First, the controller 90 may be configured to detect an SOC of the battery 70 and a torque requirement of a driver (S10). The SOC of the battery 70 may be received from a battery management system (BMS), and the torque requirement of the driver may be determined according to the pressing amount of the APS 100. The controller 90 may be configured to adjust a traveling mode, an operating point of the engine 10, a lock charge condition, and a shifting pattern of the vehicle based on the SOC of the battery 70 and the torque requirement of the driver. Hereinafter, a method of controlling the traveling mode, the operating point, the lock charge condition, and the shifting pattern based on the SOC and the torque requirement of the driver will be described in detail.

First, when the SOC region of the battery 70 is the CH region, the controller 90 may be configured to operate the vehicle to travel in the EV mode. In particular, the operation of the engine 10 may be stopped and the clutch 60 released, for the vehicle to travel only with driving power of the driving motor 50.

However, when the torque requirement of the driver exceeds a maximum torque of the driving motor 50, the engine 10 operates and the vehicle may travel in the HEV mode. When the SOC is in the CH region and the traveling mode is the HEV mode, the operating point of the engine 10 may be adjusted such that the engine 10 torque lower than that of the optimal operating line by a predetermined range is output. When the traveling mode of the vehicle is the HEV mode, the controller 90 may be configured to determine an operation mode (e.g., the serial mode, the parallel mode, or the single mode) of the electric supercharger in which power efficiency of the two electric superchargers is maximum and causes power charged in the battery 70 to be discharged at an appropriate level to maximize fuel efficiency of the engine 10. Further, the lock charge is not performed in a coasting situation.

Figure 7:
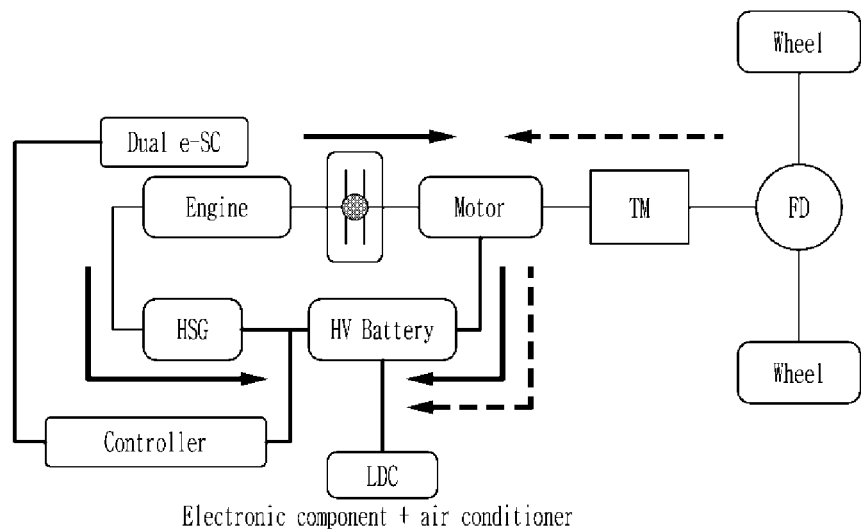
FIG. 7 is a diagram illustrating lock charge according to the exemplary embodiment of the present disclosure.

Referring to FIG. 7, the lock charge refers to operating the engine 10 without releasing the clutch 60 (e.g., in the coupling state of the clutch) in preparation for when the driver reaccelerates in the coasting situation in which the driver does not engage both the acceleration pedal and a deceleration pedal, and charge the battery 70 through the driving motor 50 and the HSG 40, which operate as the power generators, with coasting traveling energy (see a solid-line arrow of FIG. 7) and energy generated in the engine 10 (see a dotted-line arrow of FIG. 7).

The lock charge is advantageous in a re-acceleration situation immediately after the coasting. When the vehicle travels in the EV mode in the state where the coupling of the clutch 60 is released and then the clutch 60 is coupled by the reacceleration, fuel efficiency loss may be generated by the coupling of the clutch 60. Accordingly, since the lock charge may prevent the unnecessary coupling of the clutch 60, the lock charge is mainly used in the low SOC situation or the case where the vehicle travels on an uphill road on which the vehicle reaccelerates frequently.

During the lock charge, the battery 70 may be rapidly charged by increasing the engine 10 torque using the electric superchargers installed in the two intake lines. The lock charge may charge the battery 70 using both the driving motor 50 and the HSG 40, and may charge the battery 70 using only the driving motor 50 without operating the HSG 40. The controller 90 may be configured to perform the lock charge to minimize system power consumption in consideration all of power consumption of the HSG 40, power consumption of the driving motor 50, and power consumption of the two electric superchargers.

Further, when the SOC of the battery 70 is in the CH region, the controller 90 may be configured to change the shifting pattern to the normal shifting pattern, and change the shifting pattern to the catalyst protecting normal shifting pattern when a temperature of the catalyst of the catalyst converter 19 is equal to or greater than a predetermined temperature. In other words, when the SOC of the battery 70 is in the CH region, the controller 90 may be configured to operate the driving motor 50 and the electronic components through power output from the battery 70 in the EV mode, and maintain the SOC of the battery 70 at an appropriate level by operating the two electric superchargers in the HEV mode.

When the SOC of the battery 70 is in a normal high region, the controller 90 may be configured to operate the vehicle to travel in the EV mode. In particular, the operation of the engine 10 may be stopped and the clutch 60 released, for the vehicle to travel only with driving power of the driving motor 50. However, when the torque requirement of the driver exceeds a maximum torque of the driving motor 50, the engine 10 operates and the vehicle may be driven in the HEV mode. In the HEV mode, the operating point of the engine 10 may be adjusted to be the OOL. When the traveling mode of the vehicle is the HEV mode, the controller 90 may be configured to determine an operation mode (e.g., the serial mode, the parallel mode, or the single mode) of the electric supercharger in which power efficiency of the two electric superchargers is maximum and causes power charged in the battery 70 to be discharged in an appropriate level to maximize fuel efficiency of the engine 10.

Figure 8:
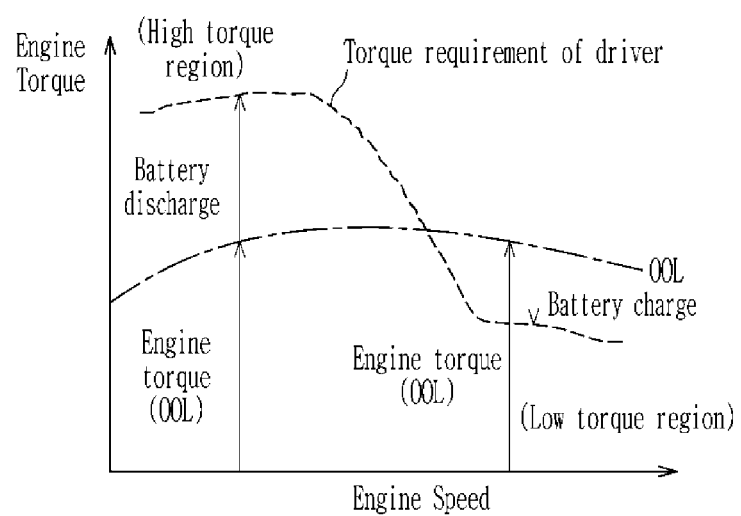
FIG. 8 is a graph illustrating an operating point of the engine in a normal high region and a normal discharge region of the SOC according to the exemplary embodiment of the present disclosure.

As illustrated in FIG. 8, when the torque requirement of the driver in the high torque region exceeds the optimal operating point, a difference between the torque requirement of the driver and the torque at the optimal operating point may be supplemented through the torque of the driving motor 50 generated through the discharge of the battery 70. In the meantime, when the torque requirement of the driver in the low torque region is less than the torque at the optimal operating point, a difference between an output torque at the optimal operating point and the torque requirement of the driver may be generated as power through the driving motor 50 or the HSG 40 and stored in the battery 70.

Further, the lock charging is not performed in a coasting situation. The controller 90 may be configured to change the shifting pattern to the normal shifting pattern, and change the shifting pattern to the catalyst protecting normal shifting pattern when a temperature of the catalyst of the catalyst converter 19 is equal to or greater than a predetermined temperature. In other words, when the SOC of the battery 70 is in the NH region, the controller 90 may be configured to operate the driving motor 50 and the electronic components through power output from the battery 70 in the EV mode, and maintain the SOC of the battery 70 at an appropriate level by operating the two electric superchargers in the HEV mode.

When the SOC of the battery 70 is in a normal discharge region, the controller 90 may be configured to adjust the traveling mode of the vehicle such that the EV mode takes priority over the HEV mode. For example, the traveling mode may be determined so that a ratio of the EV mode to the HEV mode is about 6:4. A transition of the EV mode and the HEV mode may be determined by the torque requirement of the driver.

In the HEV mode, the operating point of the engine 10 may be adjusted to be the OOL. When the traveling mode of the vehicle is the HEV mode, the controller 90 may be configured to determine an operation mode (e.g., the serial mode, the parallel mode, or the single mode) of the electric supercharger in which power efficiency of the two electric superchargers is maximum and cause power charged in the battery 70 to be discharged at an appropriate level to maximize fuel efficiency of the engine 10.

As illustrated in FIG. 8, when the torque requirement of the driver in the high torque region exceeds the optimal operating point, a difference between the torque requirement of the driver and the torque at the optimal operating point may be supplemented through the torque of the driving motor 50 generated through the discharge of the battery 70. In the meantime, when the torque requirement of the driver in the low torque region is less than the torque at the optimal operating point, a difference between an output torque at the optimal operating point and the torque requirement of the driver may be generated as power through the driving motor 50 or the HSG 40 and stored in the battery 70.

Further, the lock charge in the coasting situation is performed only when the vehicle travels on an uphill road. The controller 90 may be configured to change the shifting pattern to the normal shifting pattern, and change the shifting pattern to the catalyst protecting normal shifting pattern when a temperature of the catalyst of the catalyst converter 19 is equal to or greater than a predetermined temperature.

When the SOC of the battery 70 is in the normal discharge region, the controller 90 may be configured to operate the driving motor 50 and the electronic components through power output from the battery 70 in the EV mode, and maintain the SOC of the battery 70 at an appropriate level by operating the two electric superchargers in the HEV mode. When the SOC of the battery 70 is in the normal discharge region, the controller 90 may be configured to adjust the traveling mode of the vehicle such that the HEV mode takes priority over the EV mode. For example, the traveling mode may be determined so that a ratio of the HEV mode to the EV mode is about 6:4. A transition of the EV mode and the HEV mode may be determined by the torque requirement of the driver.

When the torque requirement of the driver is in the high torque region in the HEV mode, the operating point of the engine 10 may be adjusted to be the EGR max line, and when the torque requirement of the driver is in the low torque region that is lower than the high torque region, the operating point of the engine 10 may be adjusted to be the OOL. When the traveling mode of the vehicle is the HEV mode, the controller 90 may be configured to determine an operation mode (e.g., the serial mode, the parallel mode, or the single mode) of the electric supercharger in which power efficiency of the two electric superchargers is maximum and cause power charged in the battery 70 to be discharged at an appropriate level to maximize fuel efficiency of the engine 10.

Figure 9:
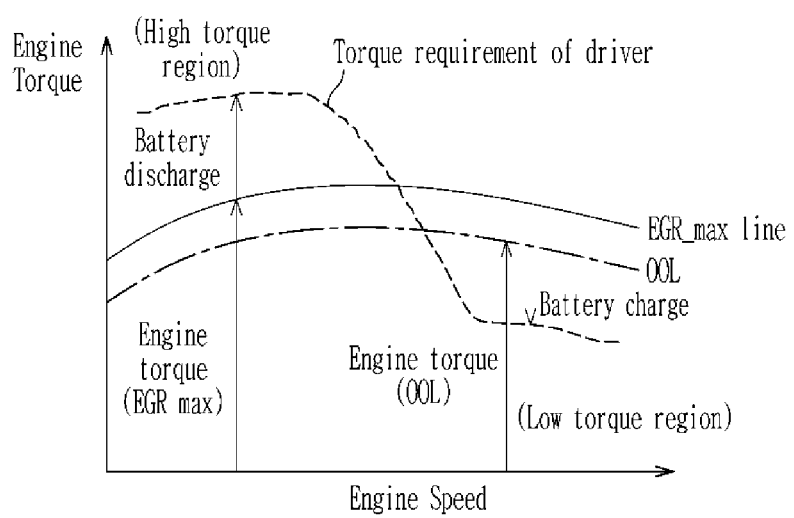
FIG. 9 is a graph illustrating an operating point of the engine in a normal charge region of the SOC according to the exemplary embodiment of the present disclosure.

As illustrated in FIG. 9, when the torque requirement of the driver in the high torque region exceeds the torque in the EGR max line, a torque difference between the torque requirement of the driver and the torque in the EGR max line may be supplemented through the torque of the driving motor 50 generated through the discharge of the battery 70. In the meantime, when the torque requirement of the driver in the low torque region is less than the torque at the optimal operating point, a difference between an output torque at the optimal operating point and the torque requirement of the driver may be generated as power through the driving motor 50 or the HSG 40 and stored in the battery 70.

Further, the lock charge in the coasting situation is performed when the vehicle travels on a flat road and on an uphill road. The controller 90 may be configured to change the shifting pattern to the normal shifting pattern, and change the shifting pattern to the catalyst protecting normal shifting pattern when a temperature of the catalyst of the catalyst converter 19 is equal to or greater than a predetermined temperature.

When the SOC of the battery 70 is in the normal charge region, partial power output from the engine 10 may be temporarily stored in the battery 70 through the driving motor 50 in the HEV mode, and the electric superchargers and the electronic component may be operated with the power temporarily stored in the battery 70. When the SOC of the battery 70 is in a low region, the controller 90 may be configured to operate the vehicle to travel in the HEV mode.

When the torque requirement of the driver is in the high torque region in the HEV mode, the operating point of the engine 10 may be adjusted to be the part load max line, and when the torque requirement of the driver is in the low torque region that is less than the high torque region, the operating point of the engine 10 may be adjusted to be the OOL. When the traveling mode of the vehicle is the HEV mode, the controller 90 may be configured to determine an operation mode (e.g., the serial mode, the parallel mode, or the single mode) of the electric supercharger in which power efficiency of the two electric superchargers is maximum and makes power charged in the battery 70 be discharged at an appropriate level to maximize fuel efficiency of the engine 10.

Figure 10:
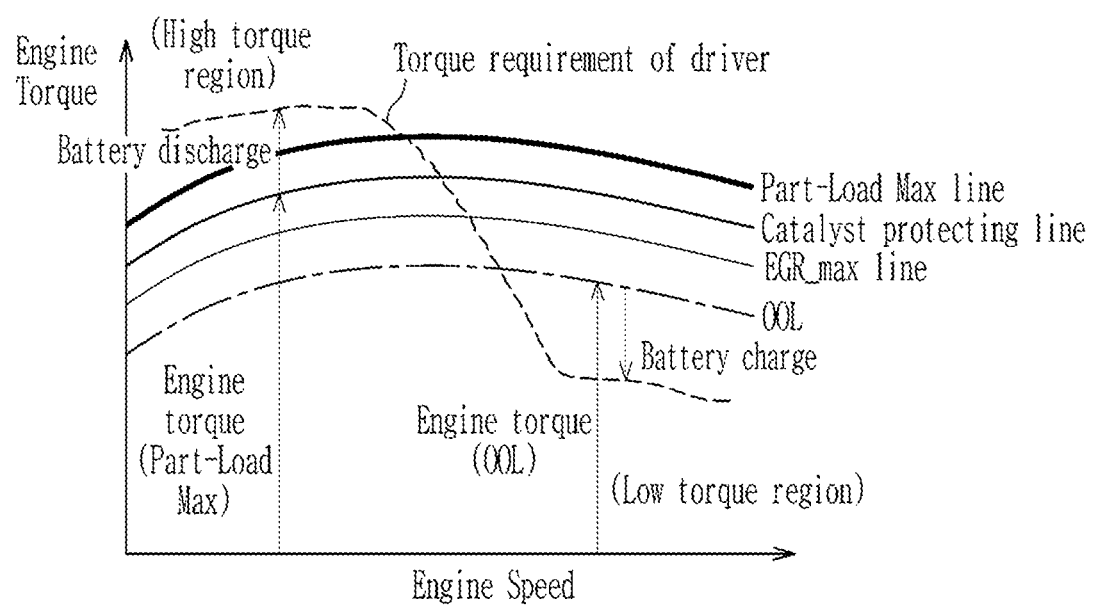
FIG. 10 is a graph illustrating an operating point of the engine in a low region of the SOC according to the exemplary embodiment of the present disclosure.

As illustrated in FIG. 10, when the torque requirement of the driver in the high torque region exceeds the torque in the part load line, a torque difference (see a left dotted-line arrow of FIG. 9) between the torque requirement of the driver and the torque in the part load max line may be supplemented through the torque of the driving motor 50 generated through the discharge of the battery 70. In the meantime, when the torque requirement of the driver in the low torque region is less than the torque at the optimal operating point, a difference between an output torque at the optimal operating point and the torque requirement of the driver may be generated as power through the driving motor 50 or the HSG 40 and stored in the battery 70.

However, when the vehicle travels under a high load condition for a predetermined time (e.g., 30 minutes or longer), the operating point of the engine 10 may be adjusted to the catalyst protecting line. When the vehicle is operated under a high load condition for a long time, a temperature of the catalyst may excessively increase, and thus, the deterioration of the catalyst may be prevented by operating the engine 10 in the catalyst protecting line.

Accordingly, as illustrated in FIG. 10, when the torque requirement of the driver in the high torque region exceeds the torque in the catalyst protecting line, a difference (see a left solid-line arrow of FIG. 9) between the torque requirement of the driver and the torque in the catalyst protecting line may be supplemented through the torque of the driving motor 50 generated through the discharge of the battery 70. In the meantime, when the torque requirement of the driver in the low torque region is less than the torque at the optimal operating point, a difference between an output torque at the optimal operating point and the torque requirement of the driver may be generated as power through the driving motor 50 or the HSG 40 and stored in the battery 70.

Further, the lock charge in the coasting situation may be performed when the vehicle travels on a flat road and an uphill road. Further, the controller 90 may be configured to change the shifting pattern to the normal shifting pattern, and change the shifting pattern to the catalyst protecting low shifting pattern when a temperature of the catalyst of the catalyst converter 19 is equal to or greater than a predetermined temperature.

When the SOC of the battery 70 is in the low region, partial power output from the engine 10 in the HEV mode may be temporarily stored in the battery 70 through the driving motor 50 in the HEV mode, and the electric superchargers and the electronic component may be operated with the power temporarily stored in the battery 70. Otherwise, when the SOC of the battery 70 is in the critical low region, the controller 90 may also be configured to operate the vehicle to travel in the HEV mode.

When the torque requirement of the driver is in the high torque region in the HEV mode, the operating point of the engine 10 may be adjusted to be the full load max line, and when the torque requirement of the driver is in the low torque region that is less than the high torque region, the operating point of the engine 10 may be adjusted to be the OOL. When the traveling mode of the vehicle is the HEV mode, the controller 90 may be configured to determine an operation mode (e.g., the serial mode, the parallel mode, or the single mode) of the electric supercharger in which power efficiency of the two electric superchargers is maximum and causes power charged in the battery 70 to be discharged at an appropriate level to maximize fuel efficiency of the engine 10.

Figure 11:
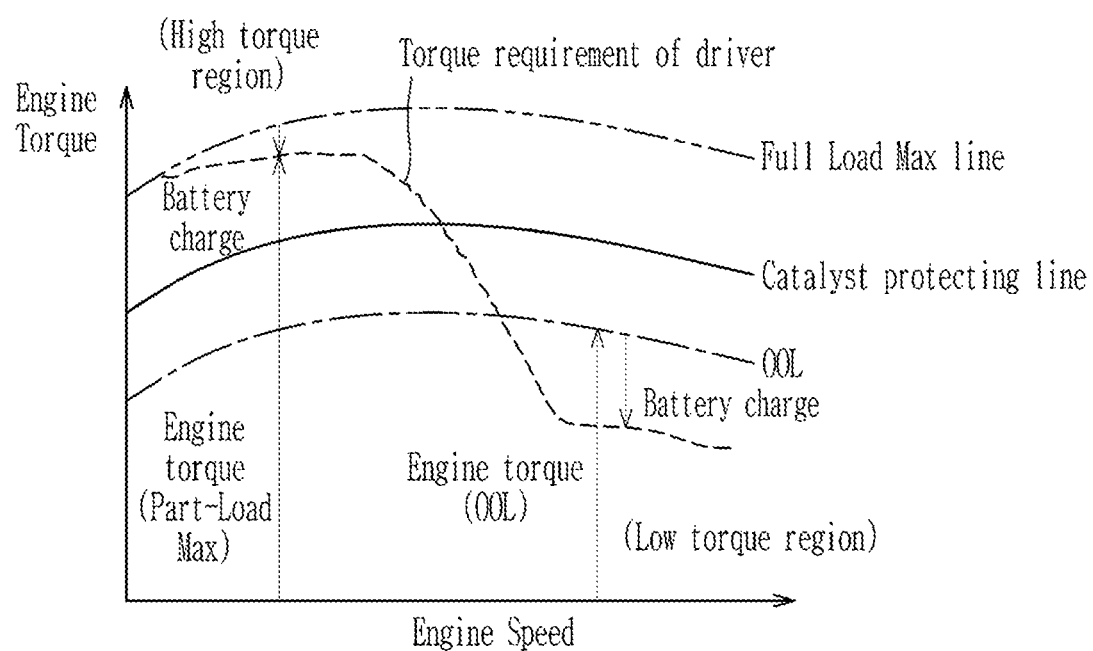
FIG. 11 is a graph illustrating an operating point of the engine in a critical low region of the SOC according to the exemplary embodiment of the present disclosure.

As illustrated in FIG. 11, when the torque requirement of the driver is in the high torque region is less than the full load max line, a difference between the torque requirement of the driver and the torque in the full load max line may be generated as power through the driving motor 50 or the HSG 40 and stored in the battery 70. Further, when the torque requirement of the driver in the low torque region is less than the torque at the optimal operating point, a difference between an output torque at the optimal operating point and the torque requirement of the driver may be generated as power through the driving motor 50 or the HSG 40 and stored in the battery 70. The lock charge in the coasting situation may be continuously performed.

Further, the controller 90 may be configured to change the shifting pattern to the normal shifting pattern, and change the shifting pattern to the catalyst protecting low shifting pattern when a temperature of the catalyst of the catalyst converter 19 is equal to or greater than a predetermined temperature. While this disclosure has been described in connection with what is presently considered to be practical exemplary embodiments, it is to be understood that the disclosure is not limited to the disclosed exemplary embodiments. On the contrary, it is intended to cover various modifications and equivalent arrangements included within the spirit and scope of the appended claims.

DESCRIPTION OF SYMBOLS

10: Engine
11: Combustion chamber
13: Intake manifold
14: Throttle valve
15: Exhaust manifold
17: Exhaust line
19: Catalytic converter
21: First intake line
22: Second intake line
23: Connection line
24: Main intake line
25: First intake valve
26: Second intake valve
27: Connection valve
29: Air cleaner
31: First electric supercharger
32: Second electric supercharger
35: Auxiliary intercooler
36: Main intercooler
40: HSG
50: Driving motor
60: Clutch
70: Battery
80: Transmission
90: Controller
100: APS
110: BMS

What is claimed is:

1. An apparatus for controlling a hybrid vehicle, comprising:
an engine configured to generate power by combustion of fuel;
a driving motor configured to assist power of the engine and selectively operate as a power generator to generate electric energy;
a hybrid starter and generator (HSG) configured to start the engine and selectively operate as a power generator to generate electric energy;
a clutch disposed between the engine and the driving motor;
a battery configured to supply electric energy to the driving motor or charge electric energy generated in the driving motor;
an exhaust gas recirculation apparatus configured to resupply a part of exhaust gas discharged from the engine to the engine;
two electric superchargers installed in two intake lines, in which outside air supplied to combustion chambers of the engine flows, respectively; and
a controller configured to variably adjust a traveling mode of a vehicle through the engine and the driving motor, an operating point of the engine, lock charge through the driving motor and the HSG, and a shifting pattern based on a torque requirement of a driver and a state of charge (SOC) of the battery, and determine an operation mode in which power consumption of the plurality of electric superchargers is minimized,
wherein the operation mode includes a single mode in which outside air is compressed by any one electric supercharger between the two electric superchargers, a parallel mode in which outside air is compressed by each electric supercharger, and a serial mode in which outside air primarily compressed by any one electric supercharger is additionally compressed by the other electric supercharger.

2. The apparatus of claim 1, wherein:
when the SOC of the battery is in a critical high region, the controller is configured to change the traveling mode to be an electric vehicle (EV) mode, and when the torque requirement of the driver exceeds a maximum torque of the driving motor, the controller is configured to adjust the traveling mode to be a hybrid electric vehicle (HEV) mode,
when the traveling mode is the HEV mode, the controller is configured to adjust the operating point of the engine to output an engine torque lower than that in an optimal operating line that refers to an optimal operating point of the engine by a predetermined range, and determine a shifting pattern to a normal shifting pattern, and
when a temperature of a catalyst of a catalyst converter is equal to or greater than a predetermined temperature, the controller is configured to adjust the shifting pattern to be a catalyst protecting normal shifting pattern.

3. The apparatus of claim 1, wherein:
when the SOC of the battery is in a high region, the controller is configured to adjust the traveling mode to be an electric vehicle (EV) mode, and when the torque requirement of the driver exceeds a maximum torque of the driving motor, the controller is configured to adjust the traveling mode to be a hybrid electric vehicle (HEV) mode,
when the traveling mode is the HEV mode, the controller is configured to adjust the operating point of the engine to be an optimal operating line that refers to an optimal operating point of the engine, and determines a shifting pattern to a normal shifting pattern, and
when a temperature of a catalyst of a catalyst converter is equal to or greater than a predetermined temperature, the controller is configured to adjust the shifting pattern to be a catalyst protecting normal shifting pattern.

4. The apparatus of claim 1, wherein:
when the SOC of the battery is in a normal discharge region, the controller is configured to adjust the traveling mode to prioritize an EV mode over an HEV mode,
when the traveling mode is the HEV mode, the controller is configured to adjust an operating point of the engine to be an optimal operating line,
a lock charge in a coasting state is performed when the vehicle travels on an uphill road, and
the controller is configured to determine a shifting pattern to a normal shifting pattern, and when a temperature of a catalyst of a catalyst converter is equal to or greater than a predetermined temperature, the controller is configured to adjust the shifting pattern to be a catalyst protecting normal shifting pattern.

5. The apparatus of claim 1, wherein:
when the SOC of the battery is in a normal charge region, the controller is configured to adjust the traveling mode to prioritize an HEV mode over an EV mode,
in a case where the traveling mode is the HEV mode, when the torque requirement of the driver is in a high torque region, the controller is configured to adjust the operating point of the engine to be an exhaust gas recirculation (EGR) max line, and when the torque requirement of the driver is in the low torque region that is lower than the high torque region, the controller is configured to adjust the operating point of the engine to be an optimal operating line,
a lock charge in a coasting state is performed when the vehicle travels a flat road and on an uphill road, and the controller is configured to change a shifting pattern to a normal shifting pattern, and when a temperature of a catalyst of a catalyst converter is equal to or greater than a predetermined temperature, the controller is configured to change the shifting pattern to be a catalyst protecting normal shifting pattern.

6. The apparatus of claim 1, wherein:

when the SOC of the battery is in a low region, the controller is configured to adjust the traveling mode to be an HEV mode, in a case where the traveling mode is the HEV mode, when the torque requirement of the driver is in a high torque region, the controller is configured to adjust the operating point of the engine to be a part load max line, and when the torque requirement of the driver is in a low torque region that is lower than the high torque region, the controller is configured to adjust the operating point of the engine to be an optimal operating line, a lock charge in a coasting state is performed when the vehicle travels on a downhill road, a flat road, and on an uphill road, and the controller is configured to change a shifting pattern to a normal shifting pattern, and when a temperature of a catalyst of a catalyst converter is equal to or greater than a predetermined temperature, the controller is configured to change the shifting pattern to be a catalyst protecting low shifting pattern.

7. The apparatus of claim 1, wherein:

when the SOC of the battery is in a low region, the controller is configured to adjust the traveling mode to be an HEV mode, in a case where the traveling mode is the HEV mode, when the torque requirement of the driver is in a high torque region, the controller is configured to adjust the operating point of the engine to be a part load max line, and when the torque requirement of the driver is in a low torque region that is lower than the high torque region, the controller is configured to adjust the operating point of the engine to be an optimal operating line, and when the vehicle travels under a high load condition for a predetermined time or longer, the controller is configured to adjust the operating point of the engine to be a catalyst protecting temperature line, a lock charge in a coasting state is performed when the vehicle travels a flat road and on an uphill road, and the controller is configured to determine a shifting pattern to a normal shifting pattern, and when a temperature of a catalyst of a catalyst converter is equal to or greater than a predetermined temperature, the controller is configured to change the shifting pattern to be a catalyst protecting low shifting pattern.

8. The apparatus of claim 1, wherein:

when the SOC of the battery is in a critical low region, the controller is configured to adjust the traveling mode to be an HEV mode, when the torque requirement of the driver is in a high torque region, the controller is configured to adjust the operating point of the engine to be a full load max line, and when the torque requirement of the driver is in a low torque region that is lower than the high torque region, the controller is configured to adjust the operating point of the engine to be an optimal operating line, when the vehicle is stopping, the controller is configured to operate the engine to perform an idle charge, the controller is configured to continuously perform a lock charge in a coasting state, and the controller is configured to determine a shifting pattern as a normal shifting pattern, and when a temperature of a catalyst of a catalyst converter is equal to or greater than a predetermined temperature, the controller is configured to adjust the shifting pattern to be a catalyst protecting low shifting pattern.

9. A method of controlling a hybrid vehicle, comprising:

determining, by a controller, a State Of Charge (SOC) of a battery and a torque requirement of a driver; and variably adjusting, by the controller, a traveling mode of a vehicle through the engine and the driving motor of a vehicle, an operating point of the engine, a lock charge condition through the driving motor and a hybrid starter and generator (HSG), and a shifting pattern based on the torque requirement of the driver and the SOC of the battery, and determining an operation mode in which power consumption of a plurality of electric superchargers is minimized, wherein the operation mode includes a single mode in which outside air is compressed by any one electric supercharger between the two electric superchargers, a parallel mode in which outside air is compressed by each electric supercharger, and a serial mode in which outside air primarily compressed by any one electric supercharger is additionally compressed by the other electric supercharger.

10. The method of claim 9, further comprising:

when the SOC of the battery is in a critical high region, the traveling mode is controlled to be an Electric Vehicle (EV) mode, and only when the torque requirement of the driver exceeds a maximum torque of the driving motor, the traveling mode is controlled to be a Hybrid Electric Vehicle (HEV) mode, when the traveling mode is the HEV mode, the operating point of the engine is controlled to output an engine torque lower than that in an optimal operating line that means an optimal operating point of the engine by a predetermined range, and a shifting pattern is determined to a normal shifting pattern, and only when a temperature of a catalyst of a catalyst converter is equal to or higher than a predetermined temperature, the shifting pattern is controlled to be a catalyst protecting normal shifting pattern.

11. The method of claim 9, wherein:

when the SOC of the battery is in a high region, adjusting, by the controller, the traveling mode to be an EV mode, and when the torque requirement of the driver exceeds a maximum torque of the driving motor, adjusting the traveling mode to be an HEV mode, when the traveling mode is the HEV mode, adjusting, by the controller, an operating point of the engine to be an optimal operating line that refers to an optimal operating point of the engine, and determining a shifting pattern as a normal shifting pattern, and when a temperature of a catalyst of a catalyst converter is equal to or greater than a predetermined temperature, changing the shifting pattern to be a catalyst protecting normal shifting pattern.

12. The method of claim 9, further comprising:

when the SOC of the battery is in a normal discharge region, adjusting, by the controller, the traveling mode to prioritize an EV mode over an HEV mode, when the traveling mode is the HEV mode, adjusting, by the controller, an operating point of the engine to be an optimal operating line, performing a lock charge in a coasting state when the vehicle travels on an uphill road, and determining a shifting pattern as a normal shifting pattern, and when a temperature of a catalyst of a catalyst converter is equal to or greater than a predetermined temperature, adjusting the shifting pattern to be a catalyst protecting normal shifting pattern.

13. The method of claim 9, further comprising:

when the SOC of the battery is in a normal charge region, adjusting, by the controller, the traveling mode to prioritize an HEV mode over an EV mode, in a case where the traveling mode is the HEV mode, when the torque requirement of the driver is in a high torque region, adjusting, by the controller, the operating point of the engine to be an exhaust gas recirculation (EGR) max line, and when the torque requirement of the driver is in the low torque region that is lower than the high torque region, adjusting the operating point of the engine to be an optimal operating line, performing, by the controller, a lock charge in a coasting state when the vehicle travels a flat road and on an uphill road, and determining a shifting pattern as a normal shifting pattern, and when a temperature of a catalyst of a catalyst converter is equal to or greater than a predetermined temperature, adjusting the shifting pattern to be a catalyst protecting normal shifting pattern.

14. The method of claim 9, further comprising:

when the SOC of the battery is in a low region, adjusting, by the controller, the traveling mode to be an HEV mode, in a case where the traveling mode is the HEV mode, when the torque requirement of the driver is in a high torque region, adjusting by the controller, the operating point of the engine to be a part load max line, and when the torque requirement of the driver is in a low torque region that is lower than the high torque region, adjusting the operating point of the engine to be an optimal operating line, performing, by the controller, a lock charge in a coasting state when the vehicle travels on a downhill road, a flat road, and on an uphill road, and determining a shifting pattern as a normal shifting pattern, and when a temperature of a catalyst of a catalyst converter is equal to or greater than a predetermined temperature, adjusting the shifting pattern to be a catalyst protecting low shifting pattern.

15. The method of claim 9, further comprising:

when the SOC of the battery is in a low region, adjusting, by the controller, the traveling mode to be an HEV mode, in a case where the traveling mode is the HEV mode, when the torque requirement of the driver is in a high torque region, adjusting, by the controller, the operating point of the engine to be a part load max line, and when the torque requirement of the driver is in a low torque region that is lower than the high torque region, adjusting the operating point of the engine to be an optimal operating line, and when the vehicle travels under a high load condition for a predetermined time or longer, adjusting the operating point of the engine to be a catalyst protecting temperature line, performing, by the controller, a lock charge in a coasting state when the vehicle travels a flat road and on an uphill road, and determining a shifting pattern as a normal shifting pattern, and when a temperature of a catalyst of a catalyst converter is equal to or greater than a predetermined temperature, adjusting the shifting pattern to be a catalyst protecting low shifting pattern.

16. The method of claim 9, further comprising:

when the SOC of the battery is in a critical low region, adjusting, by the controller, the traveling mode to be an HEV mode, when the torque requirement of the driver is in a high torque region, adjusting, by the controller, the operating point of the engine to be a full load max line, and when the torque requirement of the driver is in a low torque region that is lower than the high torque region, adjusting the operating point of the engine to be an optimal operating line, when the vehicle is stopping, performing, by the controller, an idle charge by operating the engine, adjusting a lock charge in a coasting state to be performed continuously, and determining a shifting pattern as a normal shifting pattern, and when a temperature of a catalyst of a catalyst converter is equal to or greater than a predetermined temperature, adjusting the shifting pattern to be a catalyst protecting low shifting pattern.

\* \* \* \* \*